United States Patent
Ward

(10) Patent No.: US 11,782,422 B2
(45) Date of Patent: Oct. 10, 2023

(54) VALUE ADDED SUBSTRATE INTERLEAVING SYSTEM

(71) Applicant: Packaging Progressions, Inc., Souderton, PA (US)

(72) Inventor: Andrew Ward, Limerick, PA (US)

(73) Assignee: Pacproinc, LLC, Souderton, PA (US)

( * ) Notice: Subject to any disclaimer, the term of this patent is extended or adjusted under 35 U.S.C. 154(b) by 443 days.

(21) Appl. No.: 16/859,309

(22) Filed: Apr. 27, 2020

(65) Prior Publication Data
US 2020/0371499 A1     Nov. 26, 2020

Related U.S. Application Data

(60) Provisional application No. 62/850,208, filed on May 20, 2019.

(51) Int. Cl.
| | | |
|---|---|---|
| G05B 19/418 | (2006.01) | |
| G06F 16/9035 | (2019.01) | |

(52) U.S. Cl.
CPC ... *G05B 19/41865* (2013.01); *G05B 19/4183* (2013.01); *G05B 19/4188* (2013.01); *G06F 16/9035* (2019.01); *B65B 2210/04* (2013.01)

(58) Field of Classification Search
CPC .......... G05B 19/41865; G05B 19/4183; G05B 19/4188; G05B 2219/32046; G05B 2219/32055; G05B 2219/32127; G06F 16/9035
USPC ..................... 700/116, 115, 95, 90
See application file for complete search history.

(56) References Cited

U.S. PATENT DOCUMENTS

| | | | |
|---|---|---|---|
| 6,352,251 B1 * | 3/2002 | De Angelis ............ | B65H 45/24 493/356 |
| 8,322,970 B2 | 12/2012 | Ward et al. | |
| 8,635,837 B2 | 1/2014 | Ward et al. | |
| 2002/0089110 A1 | 7/2002 | Ely | |
| 2006/0037284 A1 * | 2/2006 | Sandberg .................. | B65B 5/06 53/252 |
| 2008/0250944 A1 | 10/2008 | Pryor et al. | |
| 2008/0267761 A1 | 10/2008 | Ward et al. | |
| 2010/0107835 A1 * | 5/2010 | Lindee .................... | B65B 35/58 83/84 |
| 2016/0324208 A1 * | 11/2016 | Van Gerwen ........ | A22C 7/0076 |

(Continued)

FOREIGN PATENT DOCUMENTS

WO    WO-2012024673 A2 *    2/2012    ............ B26D 7/325

OTHER PUBLICATIONS

Extended European Search Report for EP 20 17 4343, dated Sep. 2, 2020, 5 pp.

*Primary Examiner* — Edwyn Labaze
(74) *Attorney, Agent, or Firm* — Crowell & Moring LLP

(57) ABSTRACT

A system for interleaving substrate under food products is provided. The system includes an interleaver assembly configured to interleave substrate with food products. A programmable logic controller (PLC) includes a sensor in communication with the interleaver assembly. The sensor is configured to detect an identifier provided on each substrate stock of a plurality of substrate stocks, and each identifier is associated with an interleaving profile. The interleaver assembly interleaves the substrate with the food product according to a specific interleaving profile in response to the sensor detecting the identifier on the substrate stock.

20 Claims, 5 Drawing Sheets

(56) References Cited

U.S. PATENT DOCUMENTS

2018/0345521 A1 12/2018 Pryor et al.
2019/0125126 A1* 5/2019 Cohen .................... A47J 36/32

* cited by examiner

VALUE ADDED SUBSTRATE INTERLEAVING SYSTEM

CROSS-REFERENCE TO RELATED APPLICATION

This application is a non-provisional application which claims priority to U.S. provisional application Ser. No. 62/850,208, filed May 20, 2019, which is incorporated by reference herein in its entirety

FIELD OF THE INVENTION

The present invention generally relates to an interleaver system, and more particularly relates to an intelligent interleaver system including stored interleaving profiles for automatically handling specific types of substrates and food products.

BACKGROUND

It is generally well known how to interleave substrate with food products. Existing systems for interleaving substrate are disclosed in the following documents, which are each incorporated by reference as if fully set forth herein: U.S. Pub. 2008/0267761; U.S. Pat. Nos. 8,635,837; and 8,322,970.

In known interleaving systems, personnel must load substrate stock, typically in rolled or boxed form, onto the interleaver assembly and then manually input specific parameters regarding how the interleaver assembly will handle a particular type of substrate stock and food product. This process is time consuming and can result in human error, causing mishandling of the substrate stock or mislabeling of food products, leading to potential recalls. It is additionally difficult to process differing types of food products consecutively due to different flavoring or treatments and the need to process and handle different types of food products according to different protocols.

It would be desirable to provide a more intelligent and more automated system and method for processing batches of food products.

SUMMARY

A system for interleaving substrate under food products is provided. The system includes an interleaver assembly configured to interleave substrate with food products. A programmable logic controller (PLC) includes a sensor in communication with the interleaver assembly. The sensor is configured to detect an identifier provided on each substrate stock of a plurality of substrate stocks, and each identifier is associated with an interleaving profile. The interleaver assembly interleaves the substrate with the food product according to a specific interleaving profile in response to the sensor detecting the identifier on the substrate stock.

In one embodiment, the interleaving profile includes data regarding at least one of: food product flavoring, food product additives, substrate width, substrate weight, or substrate thickness.

A user interface is preferably connected to the PLC. The user interface is configured to allow users to select specific parameters for the interleaving profile. The user interface is configured to allow users to select a dosing concentration which corresponds to a degree of contact between the substrate and the food product. The identifier is preferably a radio-frequency identifier.

In one embodiment, substrate on the plurality of substrate stocks is coated with at least one of: flavoring, coloring, or an anti-microbial solution.

The system can also include a server in communication with the PLC, and the server tracks information regarding which substrate stock has been detected by the sensor.

The plurality of substrate stocks includes at least a first substrate stock and a second substrate stock, and the interleaver assembly adjusts a size of a substrate sheet from the substrate stock and an amount of contact between a substrate sheet from the substrate stock and the food product based on the identifier.

A method of interleaving substrate sheets with food products is also provided. The method includes scanning an identifier provided on a substrate stock via a sensor in communication with an interleaver assembly. The method includes interleaving a substrate sheet from the substrate stock with a food product via the interleaver assembly based on an interleaving profile associated with the identifier. Other embodiments are disclosed herein.

BRIEF DESCRIPTION OF THE DRAWINGS

The foregoing Summary and the following detailed description will be better understood when read in conjunction with the appended drawings, which illustrate a preferred embodiment of the invention. In the drawings.

DETAILED DESCRIPTION OF THE PREFERRED EMBODIMENTS

Figure 1:
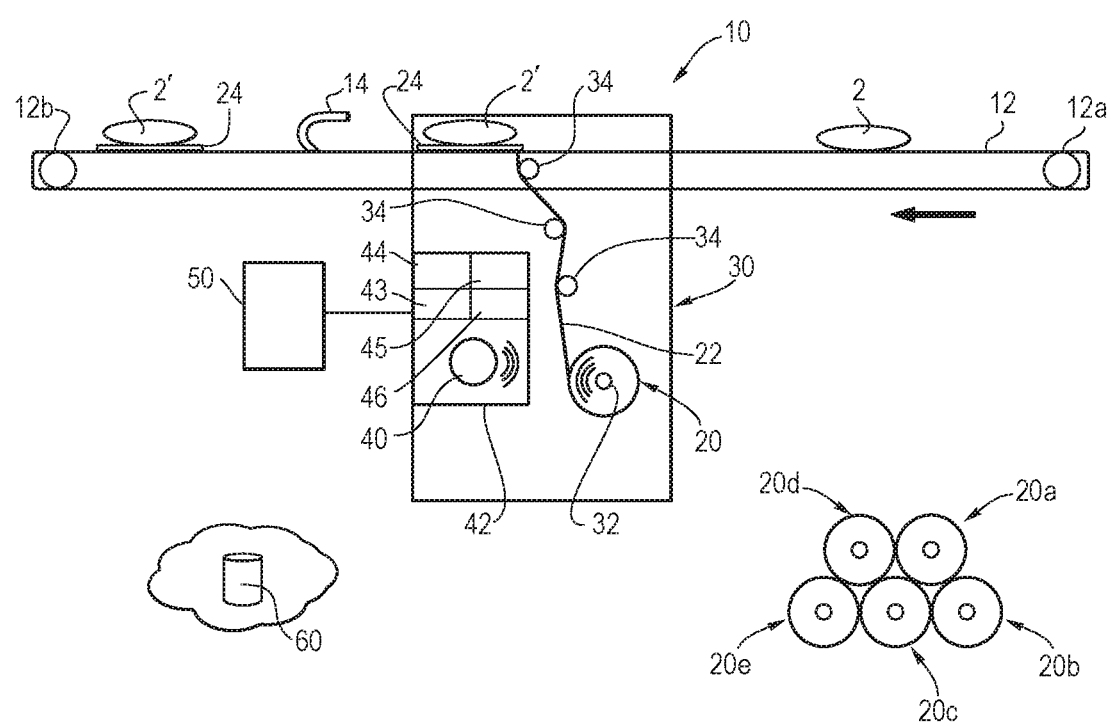
FIG. 1 is a schematic illustration of an embodiment of an interleaving arrangement.

Certain terminology is used in the following description for convenience only and is not limiting. The words "front,' "rear," "upper" and "lower" designate directions in the drawings to which reference is made. The words "inwardly" and "outwardly" refer to directions toward and away from the parts referenced in the drawings. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

As shown in FIG. 1, a schematic illustration is provided for a system 10 that interleaves substrate 20, 22 (more specifically, a substrate sheet 24) under food products 2 via an interleaver assembly 30. The system 10 includes a conveyor 12 that is configured to transport food products 2 from a trailing end 12a to leading end 12b of the conveyor 12.

Figure 2A:
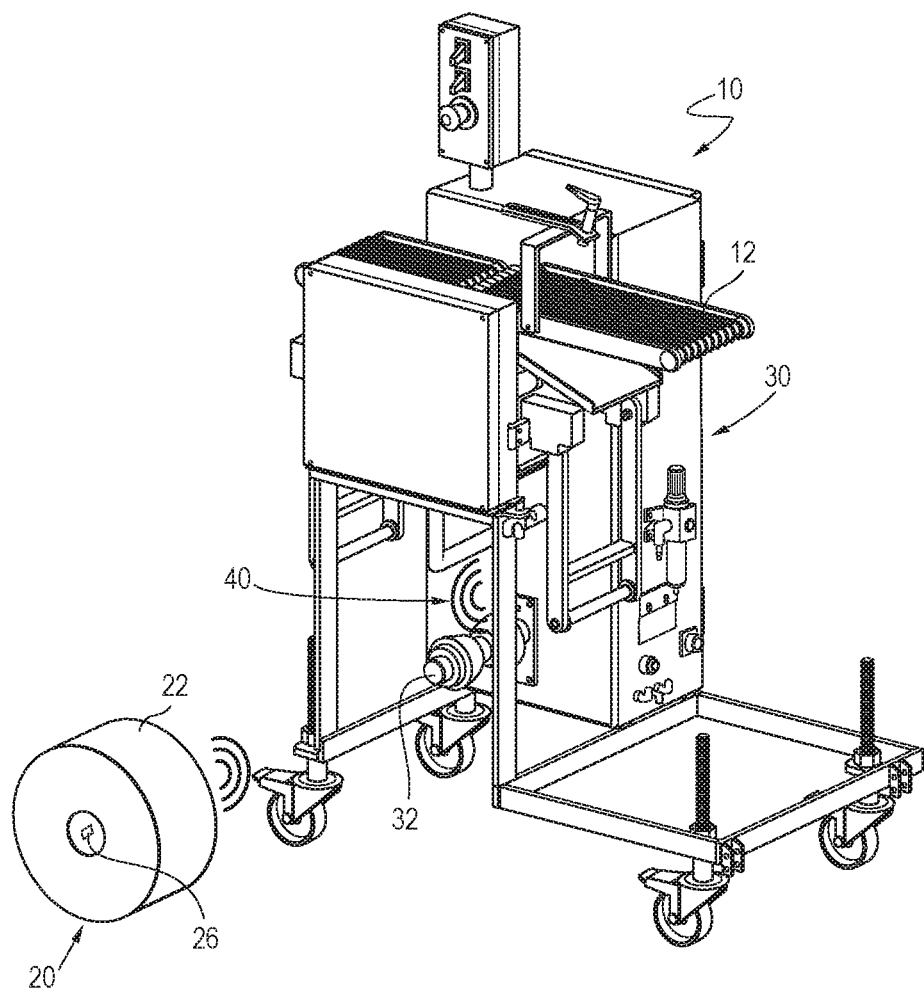
FIG. 2A is a perspective view of an interleaving arrangement with an uninstalled substrate stock in rolled form.
Figure 2B:
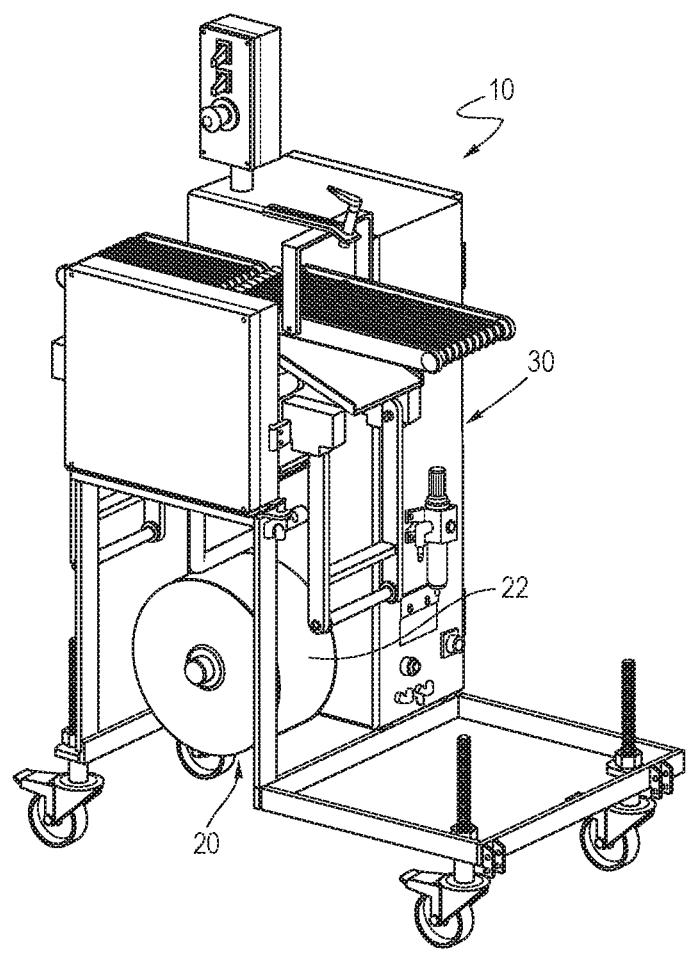
FIG. 2B is a perspective view of the interleaving arrangement of FIG. 2A with the substrate stock installed.
Figure 3A:
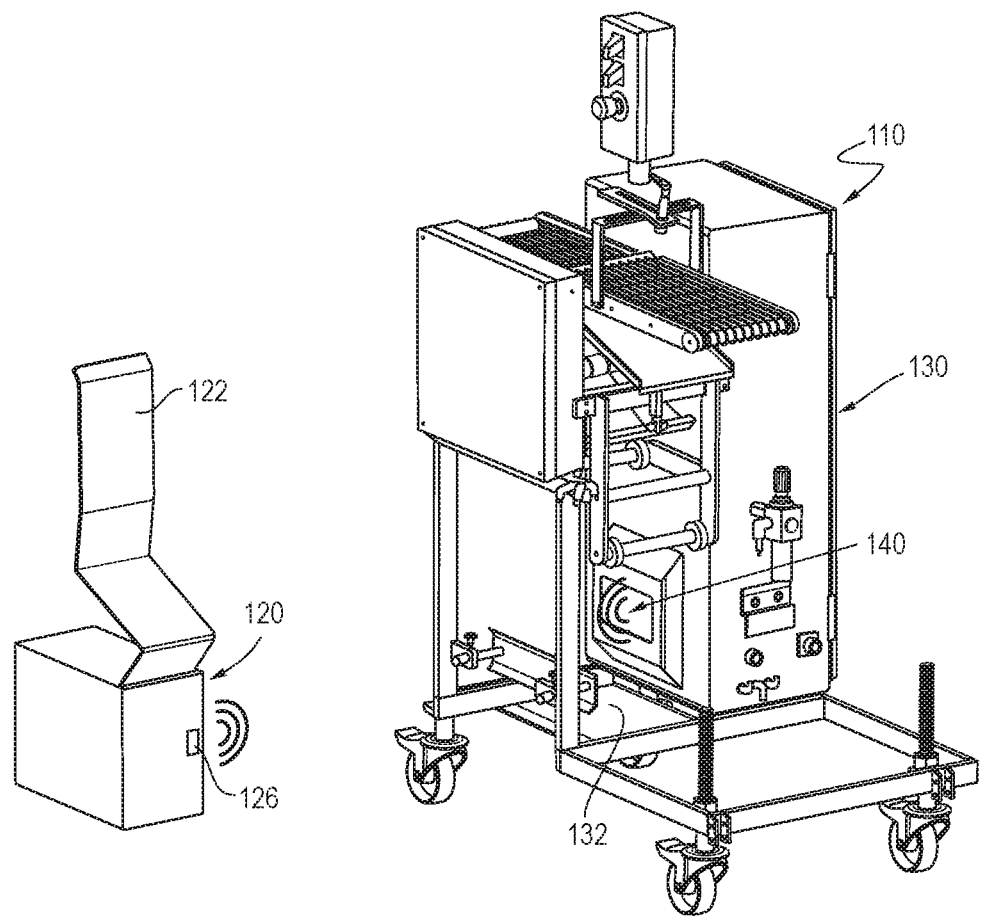
FIG. 3A is a perspective view of an interleaving arrangement with an uninstalled substrate stock in boxed form.
Figure 3B:
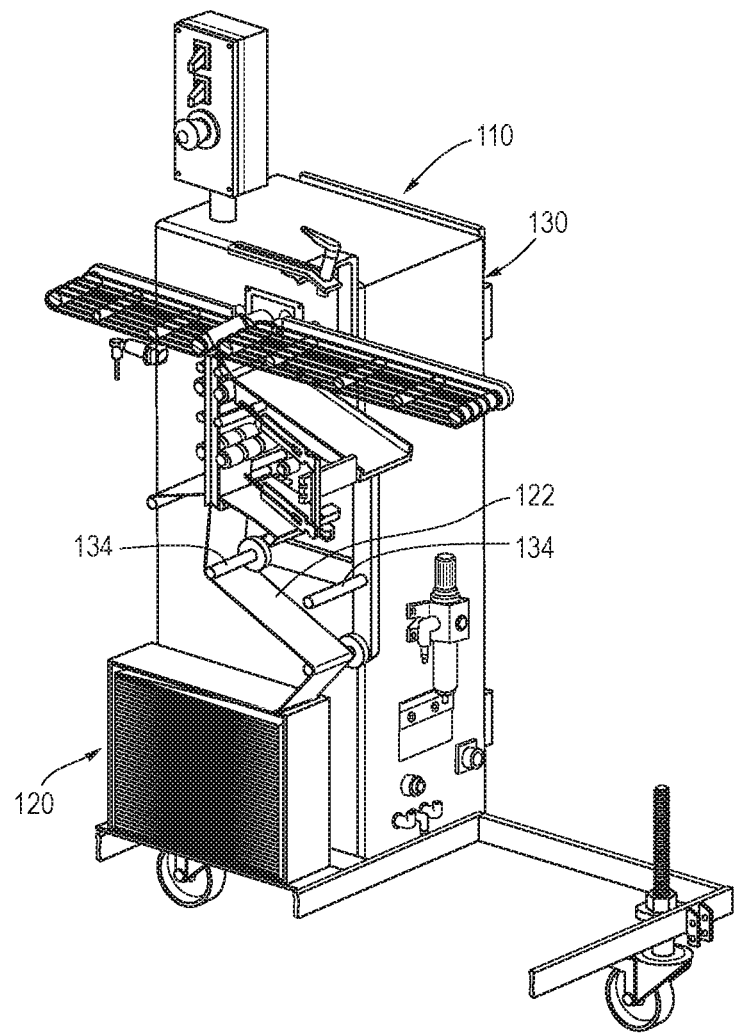
FIG. 3B is a perspective view of the interleaving arrangement of FIG. 3A with the substrate stock installed.

Two basic types of systems 10, 110 are illustrated in FIGS. 2A and 2B, and FIGS. 3A and 3B, respectively. The substrate 20 is provided in either rolled form (as shown in FIGS. 1, 2A, and 2B) or boxed form (as shown in FIGS. 3A and 3B). The general principles of operation and functions of the components are otherwise identical between the two embodiments shown in FIGS. 2A and 2B and FIGS. 3A and 3B.

Similar elements are identified by similar reference numerals, such as systems 10, 110, interleaver assembly 30, 130, etc., and are otherwise identical unless differences are specifically identified herein. The term substrate 20 and substrate stock 20 are used interchangeably herein and are identified by the same reference numerals in the drawings.

The interleaver assembly 30 is adapted to receive a roll or box of the substrate 20. The interleaver assembly 30 includes a plurality of rollers 34 adapted to drive the substrate 20 towards the conveyor 12. A gap defined between portions of the conveyor 12 is configured to receive a sheet 22 of the substrate such that the sheets 22, 24 are interleaved with the food products 2. The interleaver assembly 30 includes a substrate stock mount 32, which is shown in more detail in FIG. 2A. The mount 32 can be provided in a variety of shapes or sizes to accommodate varying substrate stocks. As shown in FIG. 3A, the mount 132 can be provided in the form of a frame.

In one embodiment, the substrate 20 is paper. One of ordinary skill in the art would understand that the substrate 20 can be formed from other materials. The substrate 20 is preferably perforated at fixed intervals. The perforations in the substrate 20 allow the substrate 20 to be quickly and efficiently pulled or torn to a specific size. One of ordinary skill in the art would understand that cutting tools or blades could be provided to cut the substrate 20 to a desired length and size for a cut sheet 24. As used herein, the term cut or cutting is generically used to refer to ripping, slicing, cutting, or otherwise removing a sheet 24 from the substrate stock 20.

Each substrate stock 20, whether in rolled or boxed form, includes an identifier 26. As shown in FIG. 1, a plurality of rolls of substrates 20 are provided, and each of the plurality of rolls of substrates 20 includes a specific identifier 26. The substrate identifier 26 is associated with an interleaving profile including data regarding at least one of: food product flavoring, food product additives, substrate width, substrate weight, or substrate thickness. This information associated with the interleaving profile is then used by the interleaver assembly 30 to handle the substrate 20 in a particular way depending on the characteristics of the substrate 20 or food products 2.

The rollers 34 and folding or wrapping arm 14, along with any driving components, motors, and any other parts of the interleaver assembly 30, are operated according to a specific interleaving profile associated with the identifier 26. In this way, the identifier 26 provides input regarding how the interleaver assembly 30 is to handle a specific type of substrate 20. The term interleaving profile is used herein to generally refer to a stored profile that includes parameters regarding how to handle a specific substrate 20 by the interleaver assembly 30.

The identifier 26 can be provided in a variety of forms, including at least one of the following: RFID tags, barcodes, authentication keys or codes, or other type of access tags or codes. One of ordinary skill in the art would understand from the present disclosure that any type of identifier can be used.

As shown in FIG. 2A, the identifier 26 can be provided on a surface of a roll around which the substrate 20 is wrapped. More specifically, the identifier 26 can be placed on a radially inner surface of the roll. As shown in FIG. 3A, the identifier 126 can be placed on an external surface of a box holding the substrate 120, which is shown with zig-zag folded substrate portions 122.

A sensor 40 is configured to read the identifiers 26 on the plurality of substrate stocks. The sensor 40 is connected to the interleaver assembly 30. The sensor 40 can be any type of sensor, including an RFID reader, barcode scanner, or other detection component capable of recognizing that the identifier 26 is present. A programmable logic controller (PLC) 42 is connected to the sensor 40 and is adapted to process information from the sensor 40. The PLC 42 can include a driver circuitry 43, memory unit 44, power unit 45, and input/output interface 46. One of ordinary skill in the art would understand from the present disclosure that any computer or electrical elements can be incorporated within the PLC 42. The PLC 42 is generally adapted to translate, interpret, transmit, receive, and/or convey information from the sensor 40 (which has read/scan/detected the identifier 26) for the interleaver assembly 30 so that the interleaver assembly 30 can handle the substrate 20 according to a particular set of parameters.

A user interface 50 is in connection and communication with the PLC 42. The user interface 50 can include controls, a display, and other features through which users or personnel can interact with, direct, and control the system 10. In one embodiment, the user interface 50 is configured to allow users to select a dosing concentration, which corresponds to an amount of dosing to the food product 2 via contact with the substrate 20. The user interface 50 allows users to access a stored treatment or recipe for a particular food product 2, and vary parameters for handling a particular food product 2.

Each substrate 20 can be treated with a predetermined dose of a substance. As used herein, the term dose, dosing, or dosage refers to the level of concentration of a specific substance on the substrate 20. As used in this context, the term substance refers to any type of matter (whether dry or wet) that is applied to the substrate 20. For example, the substance applied to the substrate 20 can include flavoring, dye, seasoning, rubs, sauce, glazes, anti-microbial solution, sanitizing solution, and/or other substances.

In one embodiment, the identifier 26 provides an authentication or tracking function for the substrate 20. Information regarding the associated food products that a particular substrate 20 is used with can be stored in the PLC 42, including information regarding the date and time of when the substrate 20 was used, which can be used for food safety and tracking the expiration dates for food products 2. The identifier 26 can also include a verification code to ensure that counterfeit or non-approved substrate stock 20 is not used with particular food products 2.

In one embodiment, the PLC 42 checks information regarding the substrate 20 via the identifier 26 to confirm that a particular type of substrate 20 can be used with a particular food product 2. The PLC 42 can provide an alert or other indicator in response to determining that a particular substrate 20 should not be used for a variety of reasons, such as expiration of the substrate 20 (e.g. due to expiration of a coating or substance of the substrate).

The PLC 42 is in communication with a server 60, which can be accessible via a data storage cloud, Internet connection, or other data connection. The server 60 tracks information regarding which substrate 20 has been used with corresponding batches of food products 2, and can provide data regarding the processing history of the interleaver assembly 30. In one embodiment, the server 60 provides an authentication step or algorithm to check that the substrate 20 that is scanned by the sensor 40 has not expired, and then sends data to a block chain enabled tracking database. Accordingly, information regarding the history of the interleaver assembly 30 and batches of food products 2 handled by the interleaver assembly 30 is reliably tracked and managed.

In general, the present disclosure provides a system and method for interleaving substrate 20 with food products 2 according to a specific set of parameters, which is communicated to the interleaver assembly 30 by a sensor 40 detecting an identifier 26 on the stock of substrate 20. The interleaver assembly 30 can then adjust a size for cutting the substrate 20 into sheets 20 or wrap the sheet 20 around a top surface of the food product 2.

As shown in FIG. 1, a folding arm or wrapping arm 14 can be provided to fold or wrap a portion of the cut sheet 24 around the food product 2. Based on how much contact the cut sheet 24 makes with the food product 2, characteristics of the processed food product 2 are varied. A degree of contact between the cut sheet 24 and the food product 2 is adjusted via the interleaver assembly 30 handling the substrate stock 20, such that dosing to achieve a particular flavor, color, or anti-microbial effect to the food products 2 is varied. For example, if less dosing is desired, then the substrate sheet 24 can contact only one side of the food product 2. If more dosing is desires, then the substrate sheet 24 can be folded over the food product 2 (via the folding arm 14 or another component).

The interleaver assembly 30 disclosed herein can be controlled or driven according to both information from a scanned identifier 26, as well as based on instructions directly input by personnel via the user interface 50. In this way, the interleaving operation has a semi-automated process through the scanning of the identifier 26.

Based on the embodiments disclosed herein, a system and method is provided that allows for more exact distribution, more precise usage track of substrates 20, and a simple way to process substrates 20 and food products 2 on demand rather than batch processing.

One of ordinary skill in the art would understand that the identifier 26 on the substrate stock 20 can include any information or instructions for the interleaver assembly 30.

Having thus described the present invention in detail, it is to be appreciated and will be apparent to those skilled in the art that many physical changes, only a few of which are exemplified in the detailed description of the invention, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

I claim:

1. A system for interleaving substrate under food products, the system comprising:
an interleaver assembly configured to interleave substrate with food products, and a programmable logic controller (PLC) including a sensor in communication with the interleaver assembly;
the sensor being configured to detect an identifier provided on each substrate stock of a plurality of substrate stocks, each identifier being associated with a predetermined interleaving profile;
such that the interleaver assembly interleaves the substrate with the food product according to a specific interleaving profile in response to the sensor detecting the identifier on the substrate stock, and
wherein the plurality of substrate stocks includes at least a first substrate stock and a second substrate stock, and based on the identifier the interleaver assembly adjusts a size of a substrate sheet from the substrate stock and an amount of contact between a substrate sheet from the substrate stock and the food product.

2. The system of claim 1, wherein the interleaving profile includes data regarding at least one of: food product flavoring, food product additives, substrate width, substrate weight, or substrate thickness.

3. The system of claim 1, further comprising a user interface connected to the PLC, wherein the user interface is configured to allow users to select specific parameters for the interleaving profile.

4. The system of claim 3, wherein the user interface is configured to allow users to select a dosing concentration which corresponds to a degree of contact between the substrate and the food product.

5. The system of claim 1, wherein the identifier is a radio-frequency identifier.

6. The system of claim 1, wherein the plurality of substrate stocks are coated with at least one of: flavoring, coloring, or an anti-microbial solution.

7. The system of claim 1, further comprising a server in communication with the PLC, wherein the server tracks information regarding which substrate stock has been detected by the sensor.

8. The system of claim 1, further comprising each substrate stock of the plurality of substrate stock including an RFID identifier associated with the predetermined interleaving profile;
wherein the sensor is configured to detect the RFID identifiers of each of the plurality of substrate stocks, and the PLC sensor's communication with the interleaver assembly being configured such that, in response to a sensor-detected RFID identifier, the interleaver assembly interleaves substrate from the plurality of substrate stocks with food products selected according to the specific interleaving profile associated with the detected RFID identifier.

9. A method of interleaving substrate sheets with food products, the method comprising:
(a) scanning an identifier provided on a substrate stock via a sensor in communication with an interleaver assembly; and
(b) interleaving a substrate sheet from the substrate stock with a food product via the interleaver assembly based on an interleaving profile associated with the identifier;
wherein the substrate stock includes at least a first substrate stock and a second substrate stock, and based on the identifier the interleaver assembly adjusts a size of a substrate sheet from the substrate stock and an amount of contact between a substrate sheet from the substrate stock and the food product.

10. The method of claim 9, wherein the identifier is a radio-frequency identifier.

11. The method of claim 9, wherein the interleaving profile includes data associated with at least one of: food product flavoring, food product additives, substrate width, substrate weight, or substrate thickness.

12. The method of claim 9, wherein a user interface is connected to a programmable logic controller (PLC) including the sensor, the user interface is configured to allow users to select specific parameters for the interleaving profile, and the user interface is configured to allow users to select a dosing concentration which corresponds to a degree of contact between the substrate and the food product.

13. The method of claim 9, further comprising a server in communication with the sensor, wherein the server stores and tracks information regarding which substrate stock has been detected by the sensor.

14. The method of claim 9, further comprising loading the substrate stock onto a mount of the interleaver assembly prior to step (a), removing the substrate stock after step (b), and then mounting a second substrate stock onto the mount of the interleaver assembly, wherein the second substrate stock has a different identifier than an identifier of the substrate stock, and the interleaver assembly handles the second substrate stock differently than the substrate stock based on the identifier.

15. A method of interleaving substrate sheets with food products, the method comprising:
(a) scanning an identifier provided on a substrate stock via a sensor in communication with an interleaver assembly; and
(b) interleaving a substrate sheet from the substrate stock with a food product via the interleaver assembly based on an interleaving profile associated with the identifier;
further comprising loading the substrate stock onto a mount of the interleaver assembly prior to step (a), removing the substrate stock after step (b), and then mounting a second substrate stock onto the mount of the interleaver assembly, wherein the second substrate stock has a different identifier than an identifier of the substrate stock, and the interleaver assembly handles the second substrate stock differently than the substrate stock based on the identifier.

16. The method of claim 15, wherein the interleaving profile includes data associated with at least one of: food product flavoring, food product additives, substrate width, substrate weight, or substrate thickness.

17. The method of claim 15, wherein the identifier is a radio-frequency identifier.

18. The method of claim 15, wherein a user interface is connected to a programmable logic controller (PLC) including the sensor, the user interface is configured to allow users to select specific parameters for the interleaving profile, and the user interface is configured to allow users to select a dosing concentration which corresponds to a degree of contact between the substrate and the food product.

19. The method of claim 15, further comprising a server in communication with the sensor, wherein the server stores and tracks information regarding which substrate stock has been detected by the sensor.

20. The method of claim 15, wherein the substrate stock includes at least a first substrate stock and a second substrate stock, and based on the identifier the interleaver assembly adjusts a size of a substrate sheet from the substrate stock and an amount of contact between a substrate sheet from the substrate stock and the food product.

* * * * *